US006622556B1

(12) United States Patent
May

(10) Patent No.: US 6,622,556 B1
(45) Date of Patent: Sep. 23, 2003

(54) TOTAL TEMPERATURE PROBE WITH COMPLIMENTARY SENSOR CAVITY

(75) Inventor: Randy Dean May, Montrose, CA (US)

(73) Assignee: SpectraSensors, Inc., Altadena, CA (US)

( * ) Notice: Subject to any disclaimer, the term of this patent is extended or adjusted under 35 U.S.C. 154(b) by 0 days.

(21) Appl. No.: 10/122,965

(22) Filed: Apr. 11, 2002

Related U.S. Application Data

(60) Provisional application No. 60/284,219, filed on Apr. 16, 2001.

(51) Int. Cl.[7] .................................................. G01F 5/00
(52) U.S. Cl. ....................................... 73/202.5; 374/135
(58) Field of Search ........................... 73/202.5, 204.11, 73/204.22, 204.21, 866.5; 374/138, 135, 143

(56) References Cited

U.S. PATENT DOCUMENTS 5,302,026 A * 4/1994 Phillips ...................... 374/135
5,628,565 A * 5/1997 Hagen et al. ............... 374/143

* cited by examiner

*Primary Examiner*—Edward Lefkowitz
*Assistant Examiner*—Corey D. Mack
(74) *Attorney, Agent, or Firm*—Carl A. Kukkonen, III

(57) ABSTRACT

A total temperature probe with a complimentary sensor cavity for measuring multiple properties of a fluid flowing rapidly through the probe. The probe includes a sensor housing for diverting a portion of the rapidly flowing fluid into a primary flow path. A sample chamber within the probe houses a total temperature probe and is configured to divert a portion of the rapidly flowing fluid from a primary flowpath. An ancillary chamber adjacent to the sample chamber is configured to house an additional sensor and to divert a portion of the rapidly flowing fluid from the sample chamber. In some embodiments, the ancillary chamber diverts fluid directly from the rapidly flowing fluid. Preferably, the sensor housed within the ancillary chamber measures the water vapor level within the rapidly flowing fluid.

20 Claims, 3 Drawing Sheets

TOTAL TEMPERATURE PROBE WITH COMPLIMENTARY SENSOR CAVITY

Pursuant to 35 U.S.C. 119(e), the present application claims priority benefit of provisional application No. 60/284,219, filed Apr. 16, 2001.

BACKGROUND OF THE INVENTION

The present invention relates to a sensor probe housing. More specifically, the present invention relates to a total temperature probe with a complimentary sensor cavity for measuring the properties of a rapidly flowing fluid.

Sensors have long been utilized to measure the properties of fast flowing fluids. This is particularly the case with jet aircraft and other air vehicles where environmental conditions can rapidly adversely affect the performance of the vehicle resulting in inefficient and/or unsafe operation of the vehicle. Environment fluid flow conditions can also be useful in connection with monitoring engine performance as well as predictive weather condition monitoring.

One type of sensor housing that can be mounted on the external surface of an aircraft such as that seen in FIG. 1 or in U.S. Pat. No. 5,653,538 to Phillips. This type of device consists of a temperature probe with a sensor housing with a sensor head and an associated scoop that together form a primary airflow path. A sample chamber inside the sensor housing diverts flowing fluid from the primary airflow path to a temperature sensor housed within the sample chamber. This configuration permits the sensor to determine the total air temperature which is a function of the ambient temperature plus any temperature rise associated with the adiabatic heating caused by resistance of the rapidly flowing fluid within the sensor housing. While this arrangement filters out large particulate so that only gases contact the temperature sensor, the sensor housing is not equipped to house additional or multifunctional sensors such as water vapor sensors.

It should therefore be appreciated that there remains a need for a sensor housing configured to simultaneously monitor multiple properties of a rapidly flowing fluid or gas.

SUMMARY OF THE INVENTION

The present invention is embodied in a probe for measuring the properties of a flowing fluid. The probe includes a sensor housing positioned at a predetermined immersion depth from a working surface, with the housing configured to provide a primary flow path for passing the liquid or gas therethrough in a primary flow path direction. In addition, a sample chamber is provided that is adjacent but out of the primary flow path. The sample chamber is fluidly connected to the primary flow path to receive a portion of the flowing fluid that is diverted to make a turn out of the primary flow path while traveling at essentially the same immersion depth as fluid flowing in the primary flow path. In addition, an ancillary chamber adjacent to the sample but out of the primary flow path, is fluidly connected to the sample chamber to receive a portion of the flowing fluid that is diverted into the sample chamber.

In some embodiments, a water vapor sensor is placed within the ancillary chamber and in other embodiments other sensors are utilized to measure the properties of the rapidly flowing fluid.

In yet another embodiment, the invention comprises a sensor housing for measuring the properties of a flowing fluid. The sensor housing includes a scoop having an inlet and an outlet, wherein the scoop provides a primary flow path for passing the fluid from the inlet to the outlet. A sample chamber houses a first sensor and is fluidly coupled to the scoop so that a portion of the fluid flowing through the scoop is diverted into the sample chamber. Furthermore, the sensor housing includes an ancillary chamber for housing a second sensor, where the ancillary chamber is fluidly coupled to the sample chamber and configured to divert a portion of the fluid flowing through the sample chamber into the ancillary chamber.

Though the current system is described in connection with a particularly constructed total temperature probe, it will be appreciated that the current system may be adapted to other probes measuring conditions within rapidly flowing fluids.

DESCRIPTION OF THE PREFERRED EMBODIMENTS

The current system and method relate to a probe for use with measuring the properties of a rapidly flowing fluid. While the following may concentrate primarily on a temperature sensor and a water vapor sensor, it will be appreciated that a variety of sensors may be utilized without departing from the spirit of the present invention.

Figure 1:
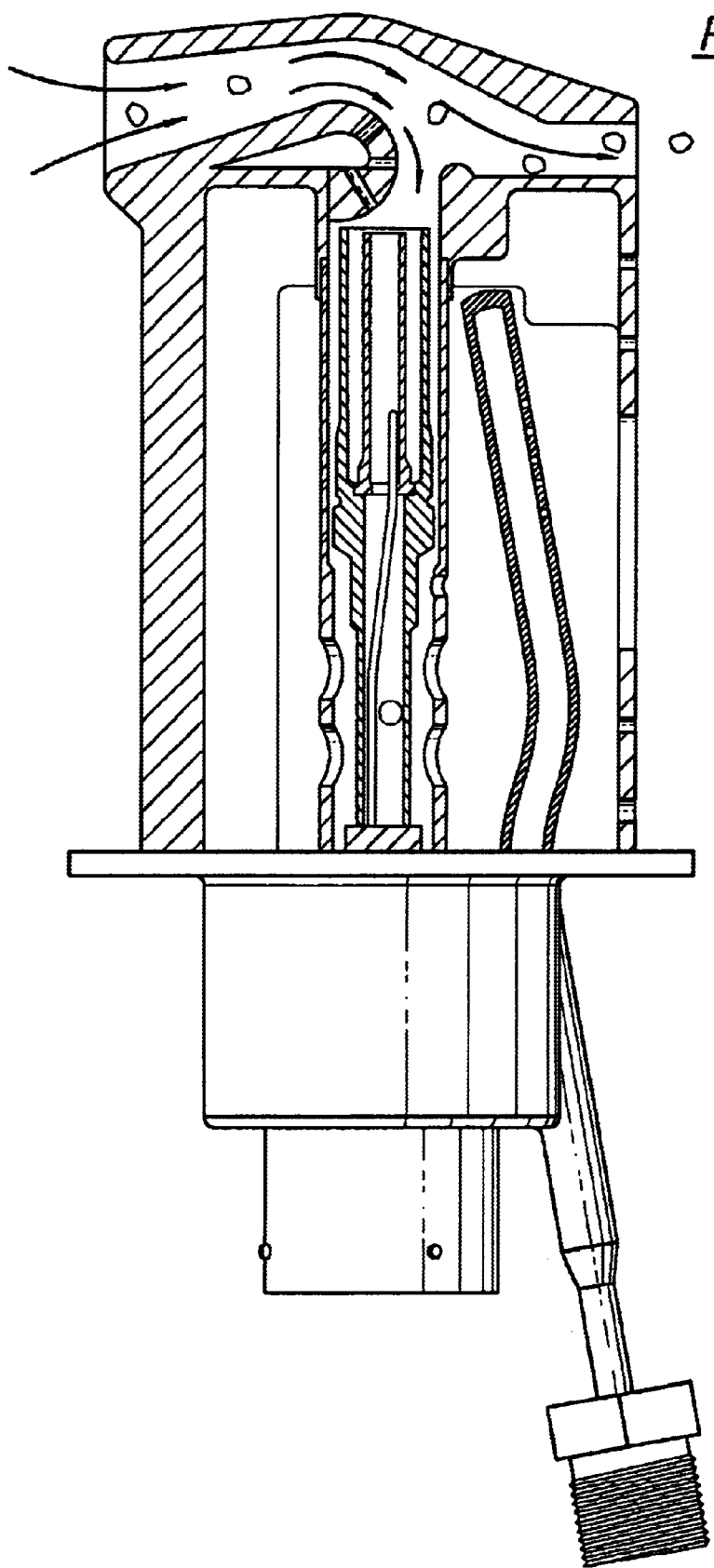
FIG. 1 is a cross sectional view of a prior art total temperature probe.
Figure 2:
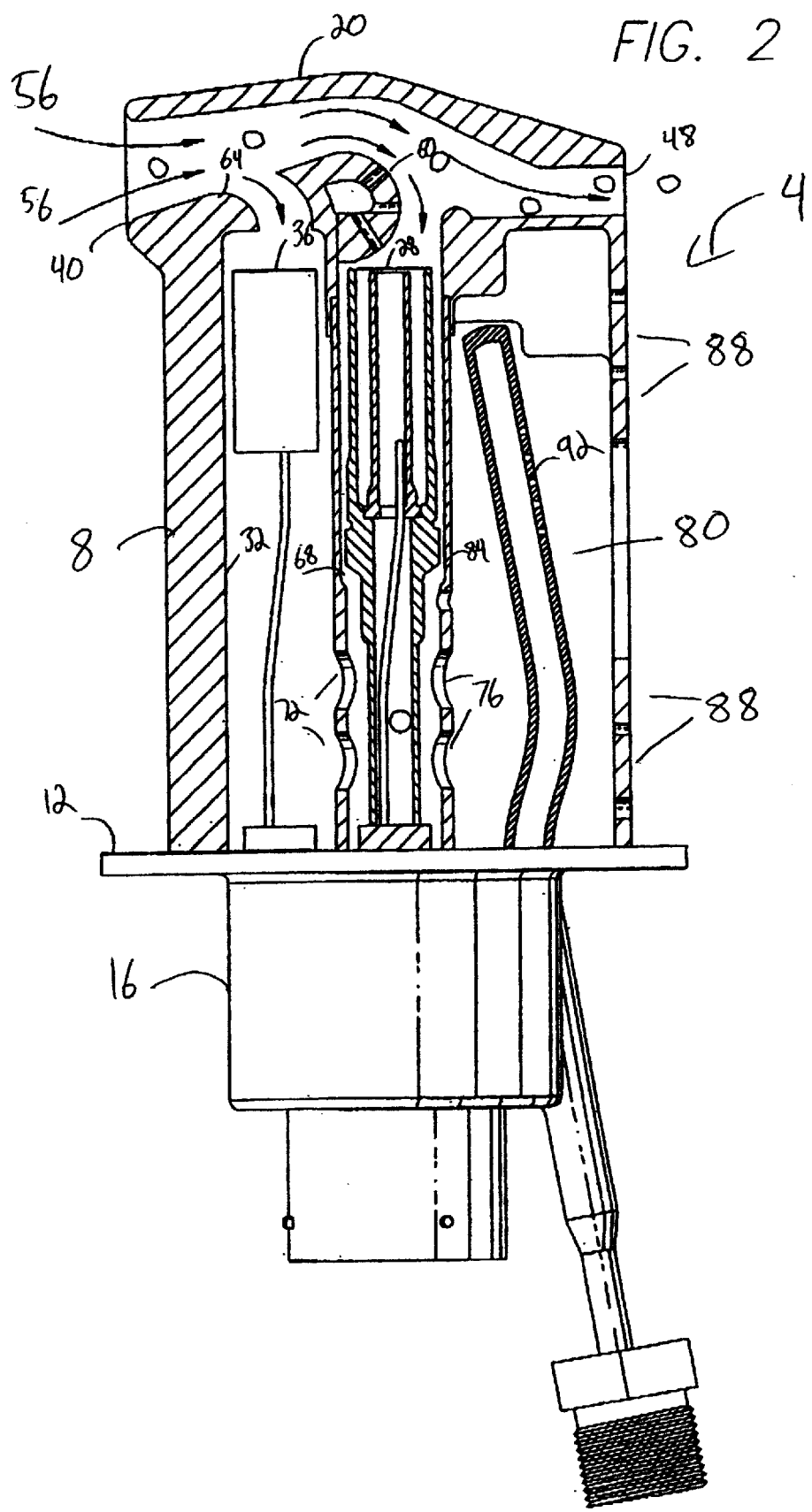
FIG. 2 is a cross-sectional view of a first embodiment of a total temperature probe having a primary flowpath with a sensor in an adjacent cavity in communication with the primary flowpath.

With reference to FIG. 2, a probe 4 is shown for measuring the properties of a rapidly flowing fluid (or gas) surrounding and moving relative to the probe (as illustrated therein). The probe generally comprises a casing 8 that is securable to a surface exposed to a rapidly flowing fluid such as the exterior of an aircraft (not shown) by a flange 12 and mounting shaft 16. The casing includes a scoop portion 20, a temperature sensor chamber 24 for housing a temperature sensor 28, an ancillary sensor chamber 32 for housing an ancillary sensor 36 such as a water vapor sensor, an inlet 40, and a particulate outlet 48.

The scoop portion 20 defines and encloses a primary flow path 52 that extends from the inlet 40 to the particulate outlet 48. Preferably, the inlet has a larger cross sectional area than the particulate outlet. Flowing gaseous fluid 56 enters the casing 8 at the inlet 40, passes through the primary flow path 52, generally following a gently curved primary flow path, and predominantly exits the casing at the particulate outlet.

The temperature sensor chamber 24 is in fluid communication with the primary flow path 52 but is displaced from the primary flow path by a first abutment 60. The ancillary sensor chamber 32 is also in fluidic communication with the primary flow path 52, but it is displaced by a second abutment 64. The temperature sensor chamber is separated from the ancillary chamber by a first structural wall 68 that has at least one flow port 72 allowing for fluidic communication between the ancillary sensor chamber and the temperature sensor chamber. The probe 4 also comprises a flow chamber 80 that is formed on one side by the casing 8 and on the other side by a second structural wall 88. The flow chamber has at least one passageway 76 fluidly connecting it to the temperature sensor chamber. Furthermore, the flow chamber also has at least one exit port 88 to provide an exit for any fluid flowing through the probe. In the alternative or in addition to the exit port(s), the probe may include an aspirator 92 that is in communication with an air source (not shown) that can inject pressurized air into the flow chamber. Typically, the aspirator is used to draw fluid through the probe to simulate conditions where the probe is subject to a rapidly flowing fluid thereby allowing the probe to more accurately measure environmental conditions when the relative speed between the probe and the flowing fluid is low.

Figure 3:
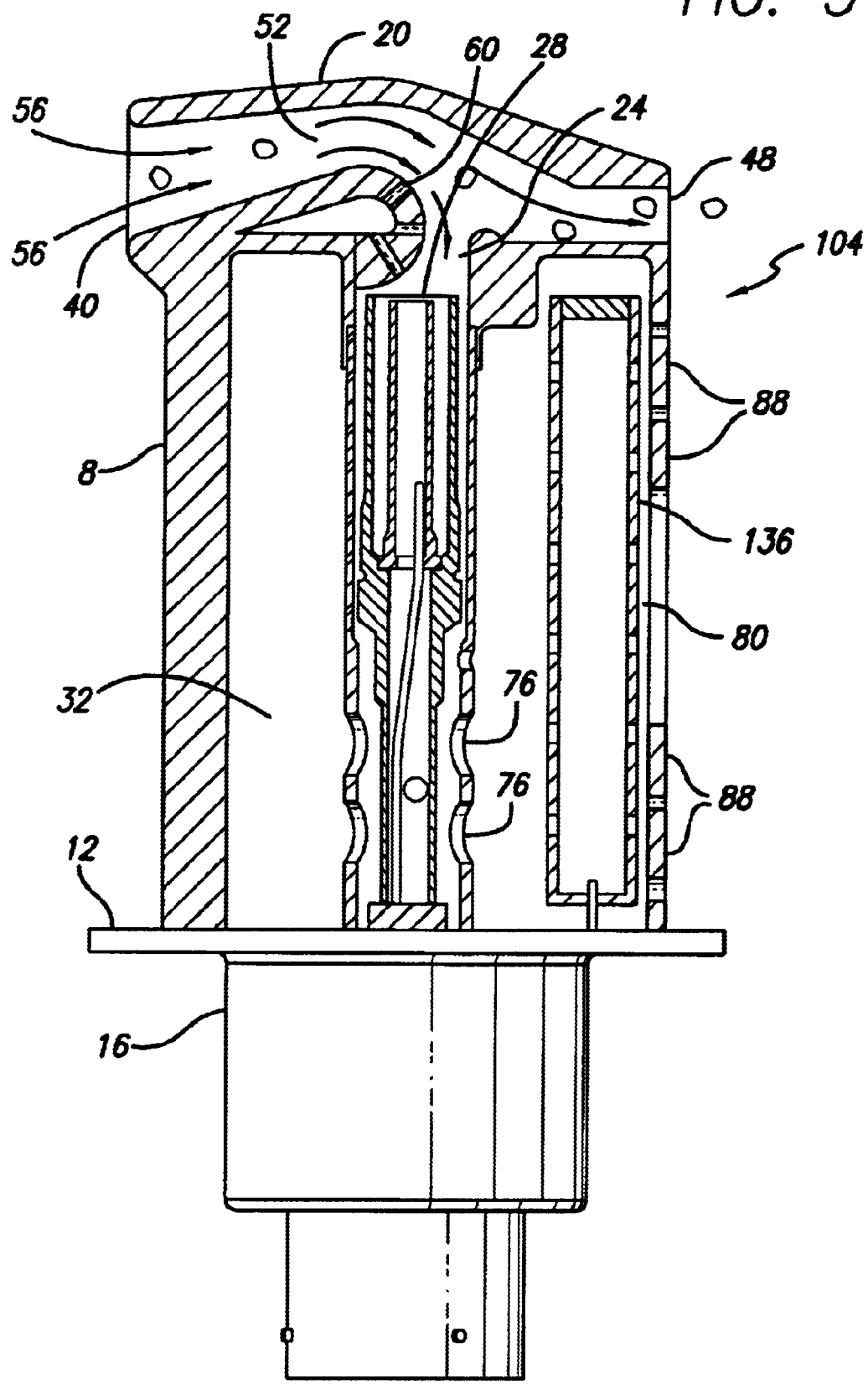
FIG. 3 is a cross-sectional view of a second embodiment of a total temperature probe having a primary flowpath connected to a secondary flowpath, and a sensor in an adjacent cavity in communication with the secondary flowpath.

With reference to FIG. 3, a probe 104 is shown wherein the ancillary sensor chamber does not fluidicly communicate with the primary flowpath 52. In addition, in this embodiment, the ancillary sensor chamber houses a sensor. Rather, a second sensor 136 is mounted within the flow chamber 80, which is configured to divert a portion of fluid received within the temperature sensor chamber through the flow chamber, and therefore to expose the second sensor 136 to the rapidly flowing fluid. Preferably, the aspirator of the previous embodiment is removed from the flow chamber or is reduced in size to accommodate the inclusion of the second sensor within the flow chamber. In operation, fluid flows into the probe as gaseous fluid 56 and enters the casing 8 at the inlet 40, passes through the primary flow path 52, generally following a gently curved primary flow path, and predominantly exits the casing at the particulate outlet 48. Some of the fluid is diverted into the temperature sensor chamber, a portion of which is in turn diverted into the flow chamber through ports 76. The second sensor 136 is then exposed to the fluid with the fluid exiting the flow chamber through the ports 88.

It will, of course, be understood that modifications to the preferred embodiments will be apparent to those skilled in the art. For example, the flow chamber can be configured to directly divert fluid from the primary flowpath. Consequently, the scope of the present invention should not be limited by the particular embodiments discussed above, but should be defined only by the claims set forth below and equivalents thereof.

What is claimed is:

1. A system for measuring the properties of a flowing fluid, comprising:

a sensor housing positioned at a predetermined immersion depth from a working surface, said housing having a primary flow path for passing the fluid therethrough in a primary flow path direction;

a sample chamber adjacent but out of the primary flow path, said sample chamber being fluidly connected to the primary flow path and configured to receive a portion of the flowing fluid that is diverted from the primary flow path; and an ancillary chamber adjacent to said sample chamber, said ancillary chamber being adjacent but out of the primary flow path and being fluidly connected to the primary flow path and configured to receive a portion of the flowing fluid that is diverted from the primary flow path.

2. The system of claim 1 further comprising a thermally responsive sensor housed within said sample chamber.

3. The system of claim 1 further comprising a water vapor sensor housed within said ancillary chamber.

4. The system of claim 1 further comprising a humidity sensor housed within said ancillary chamber.

5. The system of claim 1 further comprising a $CO_2$ sensor housed within said ancillary chamber.

6. The system of claim 1 further comprising a nitrogen sensor housed within said ancillary chamber.

7. The system of claim 1 farther comprising a temperature sensor housed within said ancillary chamber.

8. The system of claim 1 further comprising a temperature sensor housed within said first ancillary chamber.

9. A sensor housing for measuring the properties of a flowing fluid comprising:

a scoop having an inlet and an outlet, said scoop providing a primary flow path for passing the fluid from the inlet to the outlet;

a sample chamber for housing a first sensor fluidly coupled to said scoop for diverting a portion of the fluid flowing through said scoop along the primary flow path;

a first ancillary chamber for housing a second sensor fluidly coupled to said sample chamber for diverting a portion of the fluid flowing through said sample chamber; and a second ancillary chamber for housing a third sensor fluidly coupled to said scoop for diverting a portion of the fluid flowing through said scoop along the primary flow path.

10. The system of claim 9 further comprising a thermally responsive sensor housed within said sample chamber.

11. The system of claim 9 further comprising a water vapor sensor housed within said first ancillary chamber.

12. The system of claim 9 further comprising a humidity sensor housed within said first ancillary chamber.

13. The system of claim 9 further comprising a $CO_2$ sensor housed within said first ancillary chamber.

14. The system of claim 9 further comprising a nitrogen sensor housed within said ancillary chamber.

15. The system of claim 9 further comprising a water vapor sensor housed within said second ancillary chamber.

16. The system of claim 9 further comprising a humidity sensor housed within said second ancillary chamber.

17. The system of claim 9 further comprising a $CO_2$ sensor housed within said second ancillary chamber.

18. The system of claim 9 further comprising a nitrogen sensor housed within said second ancillary chamber.

19. The system of claim 9 further comprising a temperature sensor housed within said second ancillary chamber.

20. A sensor housing for measuring the properties of a flowing fluid comprising:

a scoop having an inlet and an outlet, said scoop providing a primary flow path for passing the fluid from the inlet to the outlet;

first housing means coupled to said scoop for housing a first sensor and diverting fluid from the primary flow path; and second housing means coupled to said first housing means for housing a second sensor and diverting fluid from the primary flow path.

* * * * *

UNITED STATES PATENT AND TRADEMARK OFFICE
CERTIFICATE OF CORRECTION

PATENT NO. : 6,622,556 B1  Page 1 of 1
DATED : September 23, 2003
INVENTOR(S) : Randy Dean May It is certified that error appears in the above-identified patent and that said Letters Patent is hereby corrected as shown below:

Please replace the figure on Title page and Fig. 2 with the following:

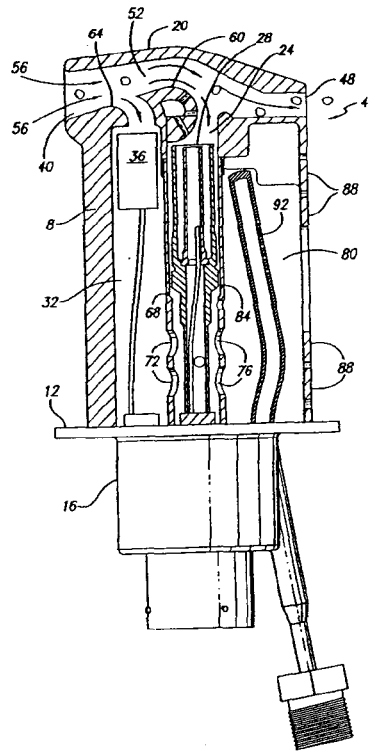

Signed and Sealed this

Twentieth Day of July, 2004

JON W. DUDAS
*Acting Director of the United States Patent and Trademark Office*